United States Patent
D'Addio et al.

(10) Patent No.: US 11,167,240 B2
(45) Date of Patent: Nov. 9, 2021

(54) REDUCING FLUCTUATIONS IN TAIL GAS FLOW FROM AN ADSORPTION UNIT

(71) Applicant: Air Products and Chemicals, Inc., Allentown, PA (US)

(72) Inventors: Elizabeth M. D'Addio, Fogelsville, PA (US); Christopher H. Wood, Schnecksville, PA (US); Quan Min Shao, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 349 days.

(21) Appl. No.: 16/421,543

(22) Filed: May 24, 2019

(65) Prior Publication Data
US 2020/0368665 A1    Nov. 26, 2020

(51) Int. Cl.
*B01D 53/047* (2006.01)
*C01B 3/56* (2006.01)

(52) U.S. Cl.
CPC .............. *B01D 53/047* (2013.01); *C01B 3/56* (2013.01); *B01D 2256/16* (2013.01); *B01D 2257/502* (2013.01); *B01D 2257/504* (2013.01); *B01D 2257/7025* (2013.01); *B01D 2259/4002* (2013.01); *B01D 2259/40009* (2013.01); *B01D 2259/40028* (2013.01); *B01D 2259/40035* (2013.01); *B01D 2259/40043* (2013.01); *B01D 2259/4062* (2013.01);
(Continued)

(58) Field of Classification Search
CPC .. B01D 53/04; B01D 53/047; B01D 2256/16; B01D 2257/502; B01D 2257/504; B01D 2257/7022; B01D 2257/7025; B01D 2259/40009; B01D 2259/4002; B01D 2259/40028; B01D 2259/40035; B01D 2259/40043; B01D 2259/40064; B01D 2259/40079; B01D 2259/40081; B01D 2259/4062; B01D 2259/4065; B01D 2259/4067; C01B 3/56; C01B 2203/0233; C01B 2203/043; C01B 2203/047; C01B 2203/0475; C01B 2203/048; C01B 2203/0827; Y02C 20/20; Y02C 20/40; Y02C 20/151; Y02C 20/156
USPC ............................................ 95/96, 103, 148
See application file for complete search history.

(56) References Cited

U.S. PATENT DOCUMENTS 8,709,136 B2 *  4/2014  Hsu .................... B01D 53/0476
                                                                    95/98
9,381,460 B2     7/2016  Weist, Jr. et al.
(Continued)

FOREIGN PATENT DOCUMENTS

EP    2823872 A2    1/2015

OTHER PUBLICATIONS

Anonymously Disclosed, Pressure Swing Adsorption Cycles for 4 to 7 Adsorption Beds, Apr. 29, 2015, 24 pgs.; IP.com.
(Continued)

*Primary Examiner* — Frank M Lawrence, Jr.
(74) *Attorney, Agent, or Firm* — Jason M. Ploeger (57) ABSTRACT

Pressure swing adsorption process for reducing fluctuations in the flow rate of tail gas from the adsorption unit. The flow rate of the stream of blowdown gas is regulated responsive signals from a sensor measuring the pressure and/or flow rate of the tail gas comprising the blowdown gas and purge gas effluent before the tail gas is introduced into a surge vessel.

7 Claims, 5 Drawing Sheets

(52) U.S. Cl.
CPC .............. *B01D 2259/40064* (2013.01); *B01D 2259/4065* (2013.01); *B01D 2259/4067* (2013.01); *B01D 2259/40079* (2013.01); *B01D 2259/40081* (2013.01); *C01B 2203/043* (2013.01); *C01B 2203/047* (2013.01); *C01B 2203/048* (2013.01); *C01B 2203/0475* (2013.01)

(56) References Cited

U.S. PATENT DOCUMENTS

| | | | |
|---|---|---|---|
| 2006/0130651 A1 | 6/2006 | Bizjak | |
| 2013/0019750 A1 | 1/2013 | Baksh et al. | |
| 2013/0239807 A1 | 9/2013 | Weist, Jr. et al. | |
| 2014/0373713 A1 | 12/2014 | Weist, Jr. et al. | |
| 2016/0097013 A1* | 4/2016 | Knaebel | B01D 53/047 95/102 |
| 2021/0053009 A1* | 2/2021 | Peng | B01D 53/047 |

OTHER PUBLICATIONS

Anonymously Disclosed, Pressure Swing Adsorption Cycles for 7 or more Adsorption Beds, May 18, 2015, 67 pgs.; IP.com.

\* cited by examiner

REDUCING FLUCTUATIONS IN TAIL GAS FLOW FROM AN ADSORPTION UNIT

BACKGROUND

This disclosure relates to pressure swing adsorption (PSA) processes, and more particularly to reducing fluctuations of the flow rate of the tail gas from the adsorption unit.

PSA processes are well-known for the separation of gas mixtures that contain components with different adsorbing characteristics. The pressure swing adsorption process may be used for separating a primary gas component from a feed gas mixture comprising the primary gas component and one or more secondary gas components. The primary gas component may be $H_2$ and the secondary gas components may be gases such as $N_2$, CO, $CO_2$, and $CH_4$, such as a reformate from a steam methane reformer or other hydrocarbon reforming process. The primary gas component may be $H_2$ and the secondary gas components may be gases such as $CH_4$, $C_2H_6$, $C_3H_8$, and/or higher alkanes, alkenes, and aromatics associated with refinery off gas streams. The primary gas component may be He and the secondary gas components may be gases such as $N_2$, $CH_4$, CO, and/or $CO_2$. The primary gas component may be $N_2$ and the secondary gas components may be gases such as $C_2H_4$, $C_2H_6$, $C_3H_6$, and/or $C_4H_8$.

Hydrogen production via pressure swing adsorption ($H_2$ PSA) is an established industry practice for supplying high purity hydrogen for petroleum refiners, chemical producing industries, metals refining, and other related industries. The feed gas mixture may be a reformate from a steam-hydrocarbon reforming process or an autothermal reforming process. The reformate may have been shifted in a shift reactor. The feed gas mixture may be a properly treated effluent stream from a gasification unit.

In a typical PSA system, a multicomponent gas is passed to at least one of multiple adsorption beds at an elevated pressure to adsorb at least one strongly sorbed component while at least one component passes through the adsorption bed. In the case of a $H_2$ PSA, $H_2$ is the most weakly adsorbed component and passes through the adsorption bed.

Pressure swing adsorption cycles comprise a number of well-known steps. The various steps of pressure swing adsorption cycles are described in EP 2823872 and US2014/0373713 (now U.S. Pat. No. 9,381,460), incorporated herein by reference. Specific pressure swing adsorption cycles are provided in companion articles "Pressure Swing Adsorption cycles for 4 to 7 adsorption beds," IP.com number 000241449, Apr. 29, 2015, and "Pressure Swing Adsorption cycles for 7 or more adsorption beds," IP.com number 000241619, May 18, 2015, each incorporated herein by reference. IP.com references may be obtained online or in the printed IP.com Journal.

The length of a step may be quantized (discretized) (i.e. an integer number of cycle time segments). However the step may be a fractional value of a cycle time segment with the balance as an idle step. The cycle time of the PSA cycle is the length of time when the feed gas mixture is first introduced into a first bed in the repetitive cycle of steps to the time when the gaseous mixture is again first introduced into the same first bed in the next repetitive cycle of steps immediately following the previous repetitive cycle of steps.

As pressure swing adsorption (PSA) processes are well-known, one of ordinary skill in the art can construct an adsorption system suitable for carrying out the process described herein. Suitable equipment for carrying out the process is well-known in the art. Operating conditions not specifically disclosed herein that are suitable for use in the process described herein are known and may be determined by one skilled in the art without undue experimentation.

The process according to the present disclosure may be carried out in axial adsorbent beds or radial adsorbent beds.

Pressure swing adsorption processes are carried out in a plurality of adsorption beds. Generally more than one adsorption bed is used so that at least one adsorption bed can be producing product gas while another bed is regenerating. In this way, product gas can be produced on a continuous basis. Any suitable number of adsorption beds may be used. In general, the PSA process is designed to meet required product purity and $H_2$ product recovery and the number of adsorption beds selected accordingly. The skilled person can readily select the number of adsorption beds to use.

The adsorption beds may contain a single adsorbent or multiple adsorbents. In the case of multiple adsorbents, the adsorbents may be interspersed, layered, or a combination thereof. Suitable adsorbents are known and may be readily selected by those skilled in the art. Activated alumina, silica gel, activated carbon, molecular sieves, and naturally occurring zeolites are common.

Figure 1:
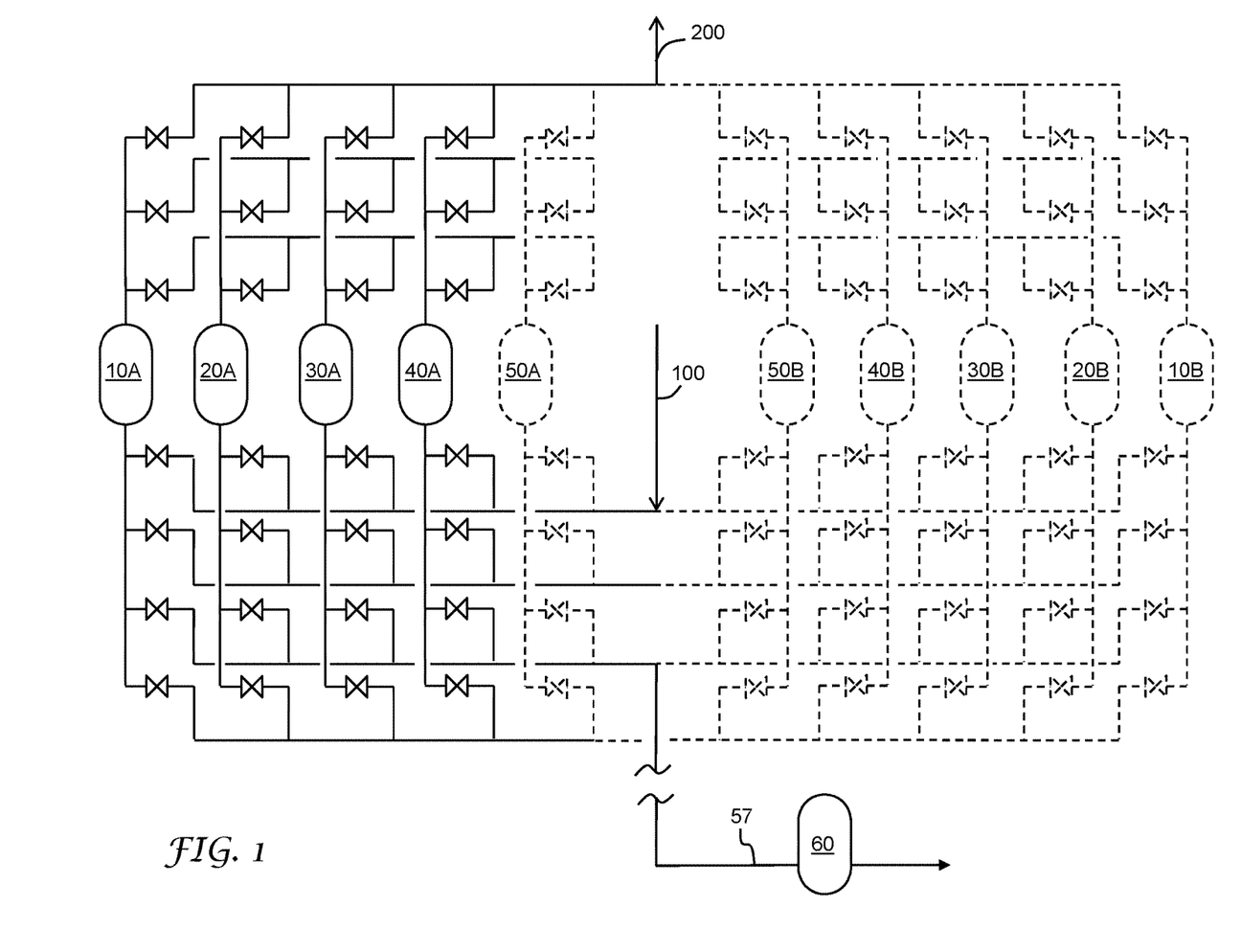
FIG. 1 is a schematic of an example adsorption system.

FIG. 1 shows a schematic of an example adsorption system with adsorption beds 10A, 20A, 30A, 40A, 50A, 10B, 20B, 30B, 40B, and 50B, suitable for a PSA process. An adsorption system may be constructed with pairs, or other multiples of beds, operating in parallel (i.e. on the same step). For example adsorption beds 10A and 10B could be configured to always be on the same step, adsorption beds 20A and 20B on the same step, etc. Alternatively, an adsorption system may be constructed without beds operating in parallel.

An adsorption bed is a grouping of adsorption material which undergoes each of the cycle steps contemporaneously. An adsorption bed may be contained in a single containment vessel or contained within multiple containment vessels.

The adsorption beds in the adsorption unit undergo a repetitive cycle of steps, some where the feed gas mixture is introduced into one or more of the adsorption beds, some where product gas is withdrawn from one or more of the adsorption beds, some where intermediate gas streams are passed between adsorption beds, and some where tail gas (by-product gas) is withdrawn from one or more of the adsorption beds.

In catalytic steam-hydrocarbon reforming, the by-product gas contains combustible gas components that have fuel value. Catalytic steam-hydrocarbon reforming is an energy intensive process. The by-product gas is passed to burners in the reformer furnace along with a supplemental (trim) fuel to provide energy for the reforming process.

However, since the pressure swing adsorption process is a cyclic process (requiring pressure swings), the flow rate, pressure, and component concentrations of by-product gas varies during the cycle.

Industry desires to minimize pressure and flow rate fluctuations of the fuel to the reformer furnace. Industry desires to operate the reformer furnace at steady temperatures optimized for furnace efficiency without exceeding temperature limits required for reformer tubes and other components to survive the furnace campaign.

In an effort to dampen pressure and flow rate fluctuations of the by-product gas passed to the burner in the reformer furnace, a surge vessel 60 is used as shown in FIG. 1. Greater dampening of pressure and flow rate fluctuations can be provided by increasing the size of the surge vessels.

Due to the capital cost of the surge vessel, industry desires to reduce the size of the surge vessel needed to dampen flow rate variation of the by-product gas (tail gas) stream passed from the adsorption unit to the burners.

The flow rate of the by-product gas from the surge vessel 60 to the burners is regulated using one or more valves. A small and large valve in parallel (not shown) can be used to regulate the flow of the by-product gas to the burners where the valve position of the large valve is set (for course control) so that the valve position of the small valve can provide flow regulation in the middle of its operating range (for fine control).

The valves between the surge vessel and the burners requires a certain amount of back pressure in the surge vessel. The pressure in the surge vessel limits the final blowdown pressure and purge gas effluent pressure for the pressure swing adsorption unit.

Industry desires to operate the pressure swing adsorption unit with lower final blowdown pressures and purge pressures because lower pressures can result in efficiency and/or yield improvements for the pressure swing adsorption unit.

BRIEF SUMMARY

The present invention relates to a process for producing a product gas and a by-product gas from a feed gas mixture in an adsorption separation unit comprising a plurality of adsorption beds, the feed gas mixture comprising a primary gas component and secondary gas components, each adsorption bed containing an adsorbent selective for the secondary gas components, the product gas enriched with the primary gas component, the by-product gas depleted of the primary gas component, where each of the plurality of adsorption beds is subjected to a repetitive cycle of steps.

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process comprising
a production step (110), which comprises introducing a stream (101) of the feed gas mixture (100) into an adsorption bed undergoing the production step (110) and adsorbing the secondary gas components on the adsorbent in the adsorption bed undergoing the production step while simultaneously withdrawing a product gas stream (200) from the adsorption bed undergoing the production step (110);

a supply purge gas step (120), which comprises co-currently withdrawing a stream of purge gas (125) from an adsorption bed undergoing the supply purge gas step (120), and passing the stream of purge gas (125) from the adsorption bed undergoing the supply purge gas step to an adsorption bed undergoing a purge step (140);

a blowdown step (130), which comprises counter-currently withdrawing a stream of blowdown gas (135) from an adsorption bed undergoing the blowdown step (140);

the purge step (140), which comprises counter-currently introducing the stream of purge gas (125) from the adsorption bed undergoing the supply purge gas step (120) into an adsorption bed undergoing the purge step (140) (the stream of purge gas which is introduced having a flow rate) and counter-currently withdrawing a stream of purge gas effluent (145) from the adsorption bed undergoing the purge step (140);

a repressurization step (150), which comprises increasing the pressure in an adsorption bed undergoing the repressurization step (150) by at least one of (i) co-currently introducing a second stream (102) of the feed gas mixture (100) into the adsorption bed undergoing the repressurization step (150), or (ii) counter-currently introducing a portion of the product gas stream (200) from the adsorption bed undergoing the production step (110) into the adsorption bed undergoing the repressurization step (150);

wherein at least one adsorption bed undergoes at least part of the purge step (140) simultaneously with at least one other adsorption bed undergoing at least part of the blowdown step (130), and the stream of purge gas effluent (145) from the adsorption bed undergoing the purge step (140) is combined with the stream of blowdown gas (135) from the adsorption bed undergoing the blowdown step (130) to form a by-product gas (tail gas) stream (57);

introducing the by-product gas stream (57) into a surge vessel (60);

withdrawing the by-product gas stream (57) from the surge vessel (60);

periodically (from time to time) obtaining signals from a sensor (55) operatively disposed to sense a pressure and/or a flow rate of the by-product gas stream (57) before the by-product gas stream (57) is introduced into the surge vessel (60);

regulating the flow rate of the stream of blowdown gas (135) that is combined with the stream of purge gas effluent during at least a portion of the blowdown step (130), where the flow rate of the stream of blowdown gas (135) is regulated responsive to the signals from the sensor (55), wherein regulating the flow rate of the stream of blowdown gas (135) comprises
increasing the flow rate of the stream of blowdown gas (135) when it is determined from the signals from the sensor (55) to increase the pressure or flow rate of the by-product gas stream (57); and
decreasing the flow rate of the stream of blowdown gas (135) when it is determined from the signals from the sensor (55) to decrease the pressure or flow rate of the by-product gas stream (57).

Aspect 2. The process according to aspect 1
wherein it is determined from the signals to increase the pressure of the by-product gas stream (57) when the pressure of the by-product gas stream (57) is less than a target lower limit set point for the pressure of the by-product gas stream (57) or it is determined from the signals to increase the flow rate of the by-product gas stream (57) when the flow rate of the by-product gas stream (57) is less than a target lower limit set point for the flow rate of the by-product gas stream (57); and
wherein it is determined from the signals to decrease the pressure of the by-product gas stream (57) when the pressure of the by-product gas stream (57) is greater than a target upper limit set point for the pressure of the by-product gas stream (57) or it is determined from the signals to decrease the flow rate of the by-product gas stream (57) when the flow rate of the by-product gas stream (57) is greater than a target upper limit set point for the flow rate of the by-product gas stream (57).

Aspect 3. The process according to aspect 1 or aspect 2 wherein the flow rate of at least one of the stream of purge gas (125) introduced into the adsorption bed undergoing the purge step (140) or the stream of purge gas effluent (145) withdrawn from the adsorption bed undergoing the purge step (140) is regulated.

Aspect 4. The process according to any one of aspects 1 to 3 wherein the sensor (55) is operatively disposed to sense the pressure of the by-product gas stream (57) before the by-product gas stream (57) is introduced into the surge vessel (60); and wherein regulating the flow rate of the stream of blowdown gas (135) comprises increasing the flow rate of the stream of blowdown gas (135) when it is determined from the signals from the sensor (55) to increase the pressure of the by-product gas stream (57); and decreasing the flow rate of the stream of blowdown gas (135) when it is determined from the signals from the sensor (55) to decrease in the pressure of the by-product gas stream (57).

Aspect 5. The process according to aspect 4 wherein it is determined from the signals to increase the pressure of the by-product gas stream (57) when the pressure of the by-product gas stream (57) is less than a target lower limit set point for the pressure of the by-product gas stream (57); and wherein it is determined from the signals to decrease the pressure of the by-product gas stream (57) when the pressure of the by-product gas stream (57) is greater than a target upper limit set point for the pressure of the by-product gas stream (57).

Aspect 6. The process according to any one of aspects 1 to 5 further comprising:

periodically obtaining signals from a flow rate sensor (65) operatively disposed to sense a flow rate of the by-product gas stream (57) after the by-product gas stream (57) is withdrawn from the surge vessel (60);

wherein regulating the flow rate of the stream of blowdown gas (135) comprises increasing the flow rate of the stream of blowdown gas (135) when it is determined from the signals from the sensor (55) and the signals from the flow rate sensor (65) to increase the pressure or flow rate of the by-product gas stream (57); and decreasing the flow rate of the stream of blowdown gas (135) when it is determined from the signals from the sensor (55) and the signals from the flow rate sensor (65) to decrease the pressure or flow rate of the by-product gas stream (57).

Aspect 7. The process according to any one of aspects 1 to 6 further comprising:

periodically obtaining signals from a pressure sensor (45) operatively disposed to sense a pressure of the stream of blowdown gas (135) withdrawn from the adsorption bed undergoing the blowdown step (140);

wherein regulating the flow rate of the stream of blowdown gas (135) comprises increasing the flow rate of the stream of blowdown gas (135) when it is determined from the signals from the sensor (55) and the signals from the pressure sensor (45) to increase the pressure or flow rate of the by-product gas stream (57); and decreasing the flow rate of the stream of blowdown gas (135) when it is determined from the signals from the sensor (55) and the signals from the pressure sensor (45) to decrease the pressure or flow rate of the by-product gas stream (57).

DETAILED DESCRIPTION OF THE PREFERRED EMBODIMENTS

The ensuing detailed description provides preferred exemplary embodiments of the process, and is not intended to limit the scope, applicability, or configuration of the process. Rather, the ensuing detailed description of the preferred exemplary embodiments will provide those skilled in the art with an enabling description for implementing the preferred exemplary embodiments of the process, it being understood that various changes may be made in the function and arrangement of elements without departing from the scope of the process as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4)

A and B and not C, (5) A and C and not B, (6) B and C and not A, and (7) A and B and C.

The term "plurality" means "two or more than two."

The phrase "at least a portion" means "a portion or all."

The term "depleted" means having a lesser mole % concentration of the indicated component than the original stream from which it was formed. "Depleted" does not mean that the stream is completely lacking the indicated component.

The terms "rich" or "enriched" means having a greater mole % concentration of the indicated component than the original stream from which it was formed.

As used herein, "flow rate" includes "volumetric flow rate," "molar flow rate," and "mass flow rate." The process may be adapted to use whichever is convenient.

The present process is a process for producing a product gas and a by-product gas from a feed gas mixture in an adsorption separation unit comprising a plurality of adsorption beds. The feed gas mixture comprises a primary gas component and secondary gas components. Each of the adsorption beds contain an adsorbent selective for the secondary gas components. The product gas is enriched with the primary gas component and the by-product gas is depleted of the primary gas component.

The feed gas mixture may be a water-depleted reformate from a catalytic steam-hydrocarbon reformer, where the feed gas mixture comprises $H_2$, CO, $CO_2$, and $CH_4$. The primary component may be $H_2$ where the product gas is a $H_2$-enriched gas. The secondary gas components may include CO, $CO_2$, and $CH_4$. The by-product gas may be a $H_2$-depleted gas.

Each of the plurality of adsorption beds is subjected to a repetitive cycle of steps (i.e. a pressure swing adsorption cycle of steps).

Figure 2:
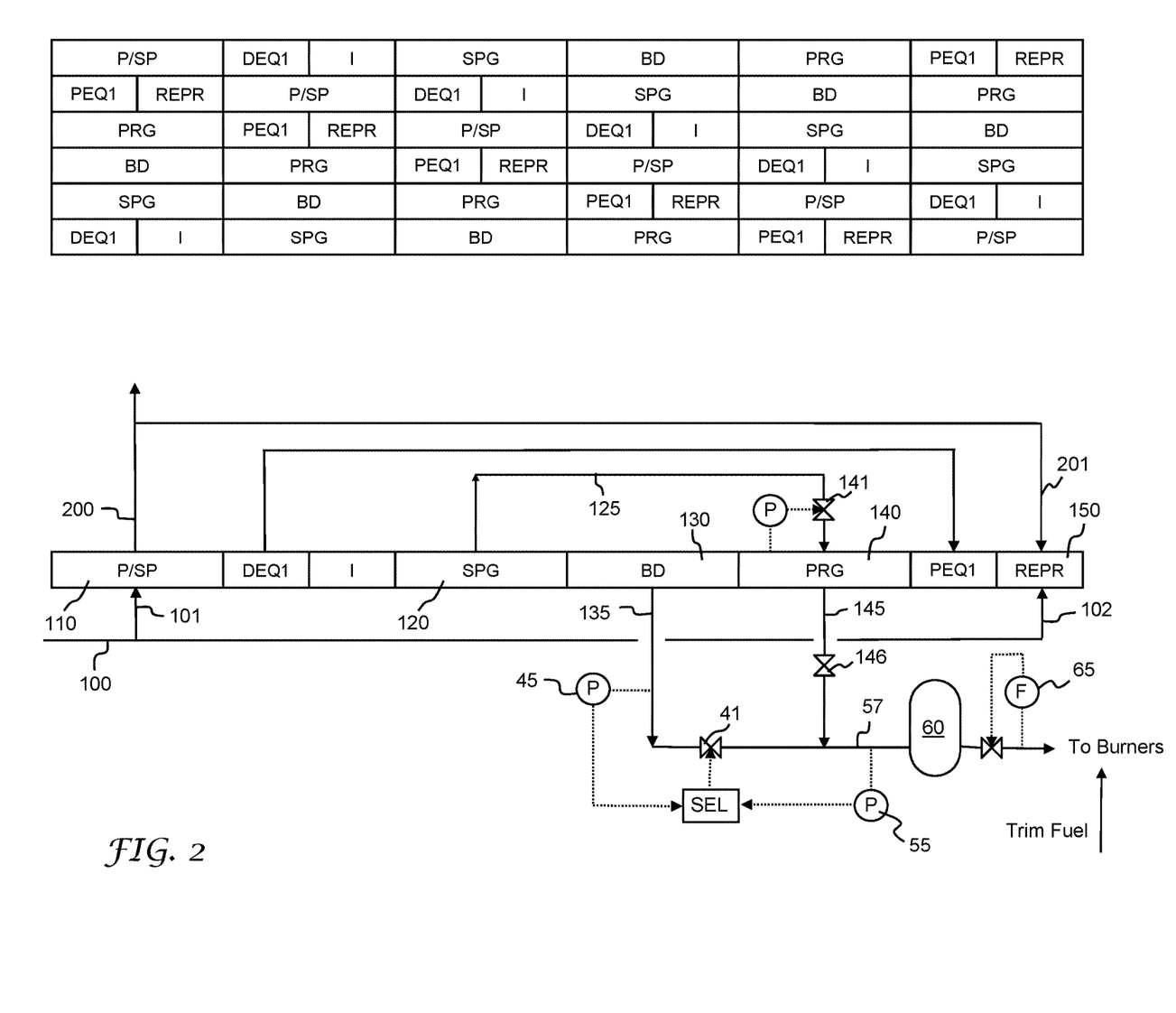
FIG. 2 is a cycle chart for a 6 bed adsorption cycle and hybrid process flow diagram showing the flow of streams for the process.
Figure 3:
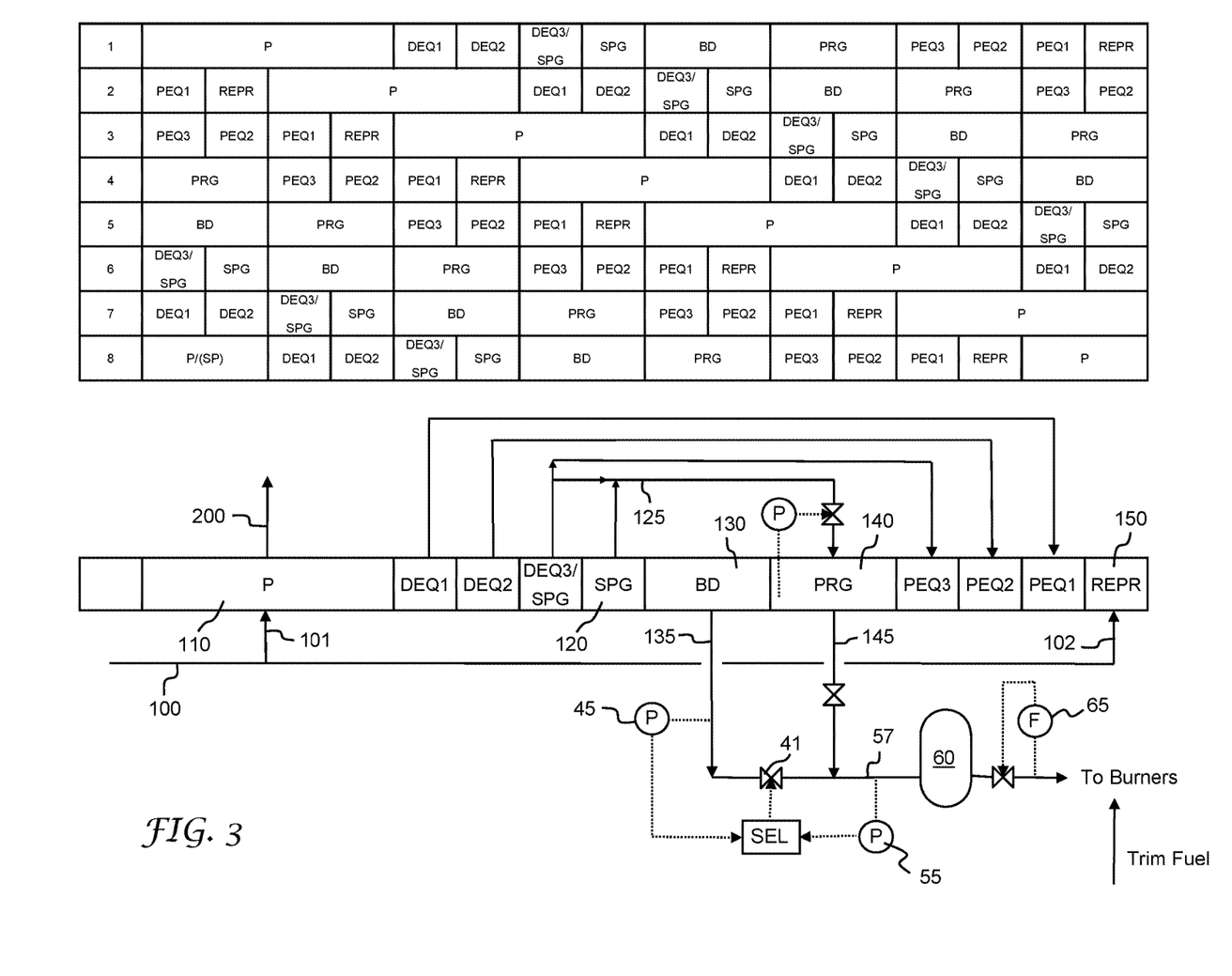
FIG. 3 is a cycle chart for an 8 bed adsorption cycle and hybrid process flow diagram showing the flow of streams for the process.

The present process is described with reference to the figures. FIG. 2 illustrates an exemplary 6 bed pressure swing adsorption cycle chart along with a hybrid process flow diagram for the cycle, and FIG. 3 illustrates an exemplary 8 bed pressure swing adsorption cycle chart along with a hybrid process flow diagram for the cycle. Details of the present process are described with reference to FIG. 2 and FIG. 3.

The 6 bed and 8 bed cycle charts and hybrid process flow diagrams are only exemplary. Any number of adsorption beds can be used with the present process subject to the limitations described below. Any pressure swing adsorption cycle can be used with the present process subject to the limitations described below.

The process comprises a production step 110. The production step is abbreviated as "P" in the cycle chart. The production step comprises introducing a stream 101 of the feed gas mixture 100 (e.g. a reformate comprising $H_2$, CO, $CO_2$, and $CH_4$) into an adsorption bed undergoing the production step 110 and adsorbing the secondary gas components (e.g. CO, $CO_2$, and $CH_4$) on the adsorbent in the adsorption bed undergoing the production step while simultaneously withdrawing a product gas stream 200 (e.g. $H_2$ product gas stream) from the adsorption bed undergoing the production step 110. The product gas contains a higher concentration of the primary gas component than the feed gas mixture and is depleted of the secondary gas components.

Any production step where a feed gas mixture is introduced and a product gas stream is simultaneously withdrawn may be used in the present process, for example the hybrid production steps Production/Rinse (P/R), Production/Supply Product (P/SP), Production/Rinse/Supply Product (P/R/SP), and Production/Supply Purge Gas (P/SPG), as disclosed in EP2823872 and US2014/0373713.

FIG. 2 shows a production step P/SP, where a portion of the product gas 200 is used to supply product gas for repressurizing an adsorption bed undergoing a repressurization step (REPR) 150. FIG. 3 shows a production step without product gas being used to supply product gas for repressurizing an adsorption bed undergoing a repressurizing step. Instead, in FIG. 3, the bed undergoing the repressurizing step is repressurized using a portion 102 of the feed gas stream 100.

Each of the adsorption beds has a "feed end" and a "product end," so termed because of their function during the production step of the adsorption cycle. A feed gas mixture is introduced into the "feed end" of the adsorption bed and a product gas is withdrawn from the "product end" during the production step of the cycle. During other steps of the adsorption cycle, gas may be introduced or withdrawn from the "feed end." Likewise, during other steps of the adsorption cycle, gas may be introduced or withdrawn from the "product end."

The direction of flow during other steps is typically described with reference to the direction of flow during the production step. Thus gas flow in the same direction as the gas flow during the production step is "co-current" (sometimes called "concurrent") and gas flow that is in the opposite direction to the gas flow during the production step is "counter-current." Co-currently introducing a gas into an adsorption bed means to introduce the gas in the same direction as the feed gas introduced during the production step (i.e. introducing into the feed end). Counter-currently introducing a gas into an adsorption bed means to introduce the gas in a direction opposite to the direction of the feed gas flow during the feed step (i.e. introducing into the product end). Co-currently withdrawing a gas from an adsorption bed means to withdraw the gas in the same direction as the product gas during the production step (i.e. withdrawing from the product end). Counter-currently withdrawing a gas from an adsorption bed means to withdraw the gas in a direction opposite to the direction of the product gas flow during the production step (i.e. withdrawing from the feed end).

The process may include any suitable number of depressurizing equalization and complementary pressurizing equalization steps as desired. The number of depressurizing equalization and complementary pressurizing equalization steps may depend on the number of adsorption beds used. Various depressurizing equalization and pressurizing equalization steps are described in EP2823872 and US2014/0373713.

FIG. 2 shows a cycle with 1 set of depressurizing equalization and complementary pressurizing equalization steps. FIG. 3 shows a cycle with 3 sets of depressurizing equalization and complementary pressurizing equalization steps.

The process comprises a supply purge gas step 120. The supply purge gas step is abbreviated "SPG" herein. The supply purge gas step (SPG) 120, comprises co-currently withdrawing a stream of purge gas 125 from an adsorption bed undergoing the supply purge gas step 120, and passing the stream of purge gas 125 from the adsorption bed undergoing the supply purge gas step 120 to an adsorption bed undergoing a purge step (PRG) 140.

An adsorption bed undergoing a supply purge gas step may supply purge gas to one or more adsorption beds undergoing a purge step.

Any supply purge gas step where a stream of purge gas is co-currently withdrawn and passed to one or more adsorption bed undergoing a purge step may be used in the present process, for example the hybrid supply purge gas steps with feed (SPG/F), rinse (SPG/R), and blowdown (SPG/BD) as disclosed in EP2823872 and US2014/0373713.

The process comprises a blowdown step 130. The blowdown step is abbreviated "BD" in the cycle charts. The blowdown step comprises counter-currently withdrawing a stream of blowdown gas 135 from an adsorption bed undergoing the blowdown step 140. The stream of blowdown gas has a flow rate that is regulated by valve 41. The blowdown gas has a concentration of the primary gas component that is lower than the concentration of the primary gas component in the feed gas mixture.

Any blowdown step where a blowdown gas is counter-currently withdrawn may be used in the present process, for example a hybrid depressurizing equalization/blow-down step DEQ/BD as disclosed in EP2823872 and US2014/0373713.

The process comprises a purge step 140. The purge step is abbreviated "PRG" in the cycle charts. The purge step comprises counter-currently introducing the stream of purge gas 125 from the adsorption bed undergoing the supply purge gas step 120 into an adsorption bed undergoing the purge step 140 and counter-currently withdrawing a stream of purge gas effluent 145 from the adsorption bed undergoing the purge step 140. The purge gas effluent 145 has a concentration of the secondary gas components that is higher than the concentration of the secondary gas components in the feed gas mixture 100.

The stream of purge gas 125 has a flow rate that may be regulated, for example by a valve 141 upstream of the adsorption bed undergoing the purge step. The flow rate of the purge gas introduced into the adsorption bed undergoing the purge step may be regulated to keep a substantially constant pressure (e.g. within 5% of a mean value) in the adsorption bed undergoing the purge step.

The stream of purge gas effluent 145 withdrawn from the adsorption bed undergoing the purge step may be regulated, for example by a valve 146 downstream of the adsorption bed undergoing the purge step. The flow rate of the stream of purge gas effluent may be regulated to keep the flow rate or pressure of the purge gas effluent substantially constant.

The process comprises a repressurization step 150. The repressurization step is abbreviated "REPR" in the cycle charts. The repressurization step comprises increasing the pressure in an adsorption bed undergoing the repressurization step 150 by at least one of (i) co-currently introducing a second stream 102 of the feed gas mixture (100) into the adsorption bed undergoing the repressurization step 150 as shown in FIG. 3, and (ii) counter-currently introducing a portion 201 of the product gas stream 200 from the adsorption bed undergoing the production step 110 into the adsorption bed undergoing the repressurization step 150 as shown in FIG. 2. The pressure in the adsorption bed undergoing the repressurizing step may be increased until the pressure is substantially at (e.g. within 5% of up to and including) the feed gas pressure.

As used herein, the term "repressurization step" is a generic term that includes the various product pressurization steps, and hybrid forms thereof, and the various feed pressurization steps, and hybrid forms thereof, cf. EP2823872 and US2014/0373713.

According to the present process, at least one adsorption bed undergoes at least part of the purge step 140 simultaneously with at least one other adsorption bed undergoing at least part of the blowdown step 130, and the stream of purge gas effluent 145 from the adsorption bed undergoing the purge step 140 is combined with the stream of blowdown gas 135 from the adsorption bed undergoing the blowdown step 130 to form a by-product gas (tail gas) stream 57. The stream of blowdown gas 135 is withdrawn from the bed undergoing the blowdown step 130 simultaneously with the withdraw of the stream of purge gas effluent 145 from the bed undergoing the purge step 140 during at least part of the purge step. The stream of blowdown gas 135 may be withdrawn from the bed undergoing the blowdown step 130 simultaneously with the withdraw of the stream of purge gas effluent 145 from the bed undergoing the purge step 140 during essentially all (at least 95% of the cycle step time) of the purge step and the blowdown step.

The present process is suitable for adsorption cycles with concurrent purge and blowdown steps, for example, the adsorption cycles shown in FIG. 2 and FIG. 3 of the present disclosure, and FIGS. 5, 10, 11, 13, 14, 15, 17, 18, 21, 24, 25, 26, 27, 30, 32, 34, 35, 36, 37, 38, 39, 40, 41, 42, 44, 45, 46, 48, 51, 52, 53, 54, 55, 56, 57, 58, 59, 61, 62, 63, 64, 65, 66, 67, and 68 of "Pressure Swing Adsorption cycles for 7 or more Adsorption Beds," IP.com Number 000241449, Apr. 29, 2015.

The process comprises introducing the by-product gas stream 57 into a surge vessel 60 and withdrawing the by-product gas stream 57 from the surge vessel 60. The surge vessel helps to dampen fluctuations of pressure and flow of the by-product gas stream 57.

The process comprises periodically (i.e. from time to time) obtaining signals from a sensor 55 operatively disposed to sense a pressure and/or a flow rate of the by-product gas stream 57 before the by-product gas stream 57 is introduced into the surge vessel 60 (i.e. upstream of the surge vessel). Sensor 55 may be a pressure sensor or a flow rate sensor.

The process comprises regulating the flow rate of the stream of blowdown gas 135 from the adsorption bed undergoing the blowdown step 130 using valve 41 prior to combining the stream of blowdown gas 135 with the stream of purge gas effluent 145 during at least a portion of the blowdown step 130. The flow rate of the stream of blowdown gas 135 may be regulated responsive to the signals from the sensor 55. Regulating the flow rate of the stream of blowdown gas 135 comprises increasing the flow rate of the stream of blowdown gas 135 when it is determined from the signals from the sensor 55 to increase the pressure or flow rate of the by-product gas stream 57, and decreasing the flow rate of the stream of blowdown gas 135 when it is determined from the signals from the sensor 55 to decrease in the pressure or flow rate of the by-product gas stream 57.

Increasing the pressure of the by-product gas stream 57 in a conduit feeding the surge vessel 60 (before the by-product gas stream 57 is introduced into the surge vessel 60) has the effect of increasing the flow rate of the by-product gas stream 57. Likewise, decreasing the pressure of the by-product gas stream 57 in a conduit feeding the surge vessel 60 (before the by-product gas stream 57 is introduced into the surge vessel 60 has the effect of decreasing the flow rate of the by-product gas stream 57.

Whether to increase or decrease the pressure or flow rate of the by-product gas stream 57 may be determined using a programmable logic controller, computer, or any other controller known in the art.

Raw signal values from sensor 55 may be used or signal values can be converted to pressure or flow rate values and the pressure or flow rate values compared to target pressure or flow rate values and the flow rate of the stream of blowdown gas 135 adjusted.

The pressure of the by-product gas stream 57 may be measured by sensor 55 and signals generated by the sensor responsive to the measurement of pressure. The measured pressure may be compared to target upper and lower limit set point pressures for the by-product gas stream. If the pressure of the by-product gas stream 57 is less than the target lower limit set point pressure, the valve position of valve 41 is adjusted to permit an increase in the flow rate of the stream of blowdown gas 135. If the pressure of the by-product gas stream 57 is greater than the target upper limit set point pressure, the valve position of valve 41 is adjusted to decrease the flow rate of the stream of blowdown gas 135.

The flow rate of the by-product gas stream 57 may be measured by sensor 55 and signals generated by the sensor responsive to the measurement of flow rate. The measured flow rate may be compared to target upper and lower limit set point flow rate for the by-product gas stream. If the flow rate of the by-product gas stream 57 is less than the target lower limit set point flow rate, the valve position of valve 41 is adjusted to permit an increase in the flow rate of the stream of blowdown gas 135. If the flow rate of the by-product gas stream 57 is greater than the target upper limit set point flow rate, the valve position of valve 41 is adjusted to decrease the flow rate of the stream of blowdown gas 135.

The by-product gas stream 57 may be passed from the surge vessel 60 to a plurality of burners in a reformer furnace. A supplemental fuel (trim fuel) may also be passed to the burners in the reformer furnace to provide the energy required for the reforming process.

The goal of regulating the flow rate of the stream of blowdown gas 135 is to provide a constant flow rate of the by-product gas stream 57 to the burners in the reformer furnace.

By regulating the flow rate of the stream of blowdown gas 135 responsive to measurements of the pressure and/or flow rate of the by-product stream 57, several benefits can be realized. A smaller surge vessel can be used because the variation in pressure and flow rate of the by-product stream 57 is reduced. Valves operatively disposed downstream of the surge vessel and upstream of the burners of the reformer furnace can be eliminated or be full open such that the surge vessel can be operated at a lower pressure. By operating the surge vessel 60 at a lower pressure, the final blowdown pressure and purge gas pressure can be lower, resulting in yield and efficiency improvements for the pressure swing adsorption unit.

The flow rate of the stream of blowdown gas 135 may be regulated using information from sensors in addition to sensor 55. For example, a flow rate sensor 65 may be used to measure the flow rate of the stream of the by-product gas withdrawn from the surge vessel 60, and/or a pressure sensor 45 may be used to measure the pressure of the stream of blowdown gas withdrawn from the adsorption bed undergoing the blowdown step 130.

Signals from the flow rate sensor 65 may be used to change the target upper and lower limit set points for the pressure or flow rate of the by-product gas stream 57.

The flow rate of the stream of the by-product gas withdrawn from the surge vessel may need to be increased or decreased in response to various operating modes at the hydrogen production facility, for example, when the steam-to-carbon ratio is adjusted, the reformer outlet temperature changes, the hydrogen production is changed, and/or the hydrocarbon feed composition changes.

The process may further comprise periodically (i.e. from time to time) obtaining signals from a flow rate sensor 65 operatively disposed to sense a flow rate of the by-product gas stream 57 after the by-product gas stream 57 is withdrawn from the surge vessel 60. Regulating the flow rate of the stream of blowdown gas 135 may comprise increasing the flow rate of the stream of blowdown gas 135 when it is determined from the signals from the sensor 55 and the signals from the flow rate sensor 65 to increase the pressure or flow rate of the by-product gas stream 57, and decreasing the flow rate of the stream of blowdown gas 135 when it is determined from the signals from the sensor 55 and the signals from the flow rate sensor 65 to decrease the pressure or flow rate of the by-product gas stream 57.

The flow rate of the stream of blowdown gas 135 may be regulated using pressure sensor 45 in addition to sensor 55. The rate of pressure decrease of the adsorption bed undergoing the blowdown step 140 may be monitored and it can be determined whether the rate of pressure decrease will result in the adsorption bed undergoing the blowdown step to be at the desired target pressure at the end of the blowdown step, greater than the desired target pressure, or depleted of blowdown gas before the scheduled end of the blowdown step. Signals from the pressure sensor 45 may be used to change the target upper and lower limit set points for the pressure or flow rate of the by-product gas stream 57. Valve 41 may be adjusted to permit more or less flow responsive to the change in the target upper and lower limit set points for the pressure or flow rate of the by-product gas stream 57.

In one or more embodiments, for the first 70% to 90% of the blowdown step, the flow rate of the stream of blowdown gas may be regulated responsive primarily to signals from the flow rate sensor 65. For the remaining 10% to 30% of the blowdown step, the flow rate of the stream of blowdown gas may be regulated responsive primarily to signals from the pressure sensor 45 in order to make sure that the desired pressure at the end of the blowdown step is achieved.

The process may further comprise periodically (i.e. from time to time) obtaining signals from a pressure sensor 45 operatively disposed to sense a pressure of the stream of blowdown gas 135 withdrawn from the adsorption bed undergoing the blowdown step 140. Regulating the flow rate of the stream of blowdown gas 135 may comprise increasing the flow rate of the stream of blowdown gas 135 when it is determined from the signals from the sensor 55 and the signals from the pressure sensor 45 to increase the pressure or flow rate of the by-product gas stream 57, and decreasing the flow rate of the stream of blowdown gas 135 when it is determined from the signals from the sensor 55 and the signals from the pressure sensor 45 to decrease the pressure or flow rate of the by-product gas stream 57.

EXAMPLES

Results of simulations are provided below to show the effect of the present process. A 10-bed pressure swing adsorption unit was simulated using the pressure swing adsorption cycle shown in FIG. 3

Comparative Example

In the comparative example, the pressure in the adsorption bed being purged is maintained at a constant 162 kPa. The flow rate of the stream of purge gas effluent is the resulting flow rate from maintaining the adsorption bed being purged at the constant pressure of 162 kPa. The flow rate of the stream of blowdown gas is the flow rate resulting from controlling the decreasing pressure ramp rate of the adsorption bed undergoing the blowdown step from the pressure at the end of the supply purge step 120 to a final blowdown pressure at a constant rate.

Figure 4:
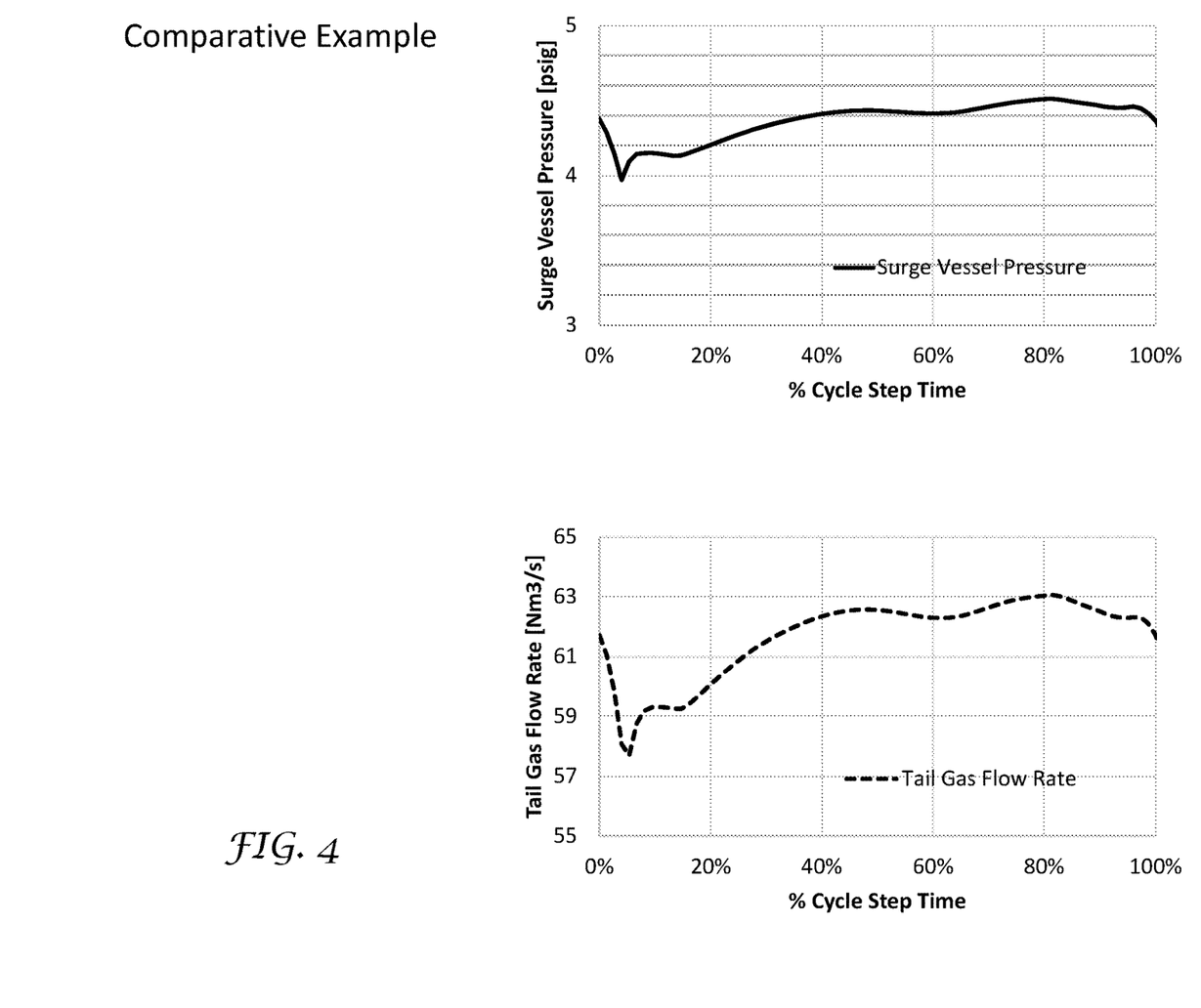
FIG. 4 is a plot of pressure of the surge vessel and flow rate of tail gas versus cycle step time for a comparative example.

The pressure set point for the surge vessel 60 was 13 kPa. The pressure of the surge vessel and flow rate of tail gas versus % cycle step time are shown in FIG. 4.

Blowdown Control Case

In the blowdown control example, the pressure in the adsorption be being purged is maintained at a constant 157 kPa, which is less than in the comparative example. A reduction in pressure of 5 kPa translates into a $H_2$ pressure swing adsorption recovery improvement of 0.17%. The pressure during the purge step can be decreased because the pressure in the surge vessel 60 can be decreased because of the blowdown control.

Figure 5:
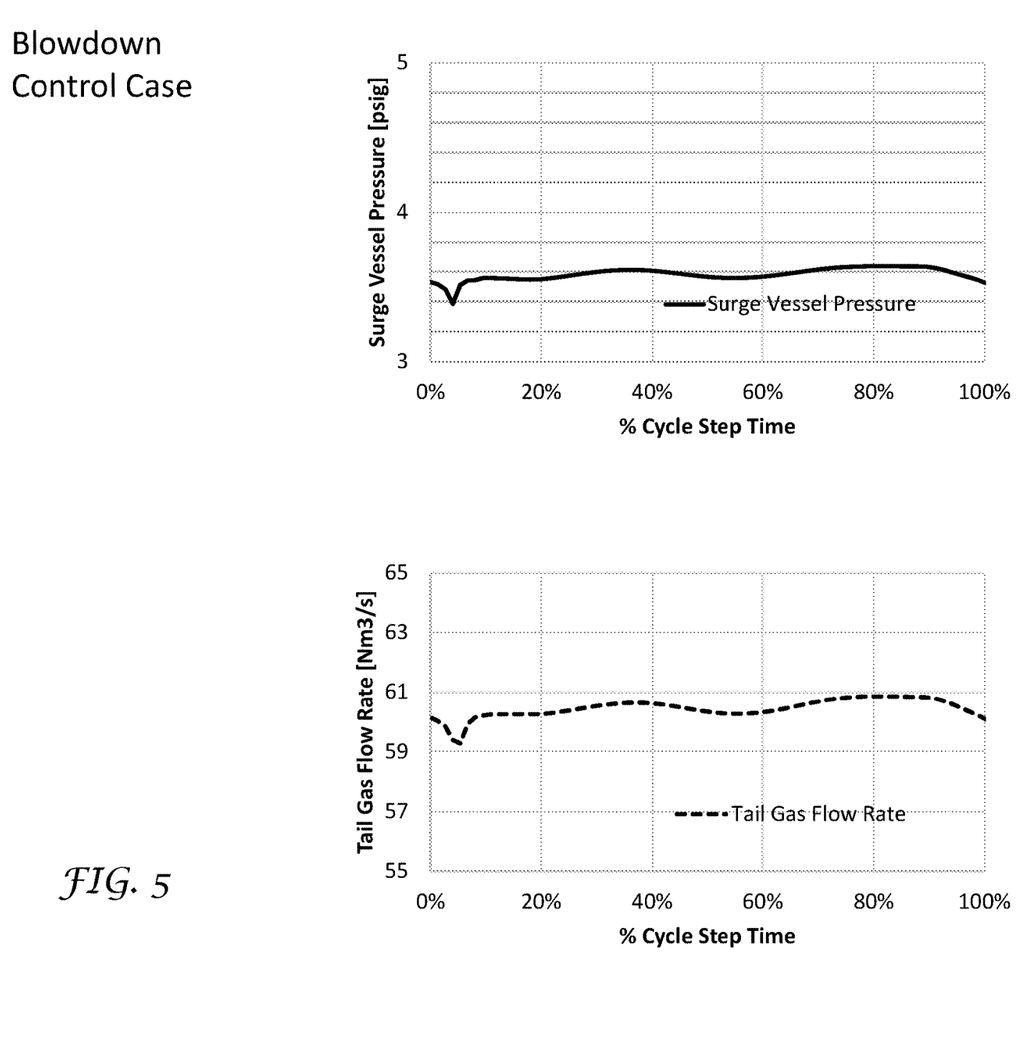
FIG. 5 is a plot of pressure of the surge vessel and flow rate of tail gas versus cycle step time for a case with blowdown control.

The flow rate of the stream of blowdown gas is regulated using valve 41 to provide a constant pressure at pressure sensor 55, which also decreases the fluctuations of the flow rate of tail gas. The pressure fluctuation is about 50% of the comparative example, which may reduce the volume of the surge vessel by up to 50%. The pressure of the surge vessel and flow rate of tail gas versus % cycle step time are shown in FIG. 5.

The invention claimed is:

1. A process for producing a product gas and a by-product gas from a feed gas mixture in an adsorption separation unit comprising a plurality of adsorption beds, the feed gas mixture comprising a primary gas component and secondary gas components, each adsorption bed containing an adsorbent selective for the secondary gas components, the product gas enriched with the primary gas component, the by-product gas depleted of the primary gas component, where each of the plurality of adsorption beds is subjected to a repetitive cycle of steps, the process comprising:

a production step, which comprises introducing a stream of the feed gas mixture into an adsorption bed undergoing the production step and adsorbing the secondary gas components on the adsorbent in the adsorption bed undergoing the production step while simultaneously withdrawing a product gas stream from the adsorption bed undergoing the production step;

a supply purge gas step, which comprises co-currently withdrawing a stream of purge gas from an adsorption bed undergoing the supply purge gas step, and passing the stream of purge gas from the adsorption bed undergoing the supply purge gas step to an adsorption bed undergoing a purge step;

a blowdown step, which comprises counter-currently withdrawing a stream of blowdown gas from an adsorption bed undergoing the blowdown step;

the purge step, which comprises counter-currently introducing the stream of purge gas from the adsorption bed undergoing the supply purge gas step into an adsorption bed undergoing the purge step and counter-currently withdrawing a stream of purge gas effluent from the adsorption bed undergoing the purge step;

a repressurization step, which comprises increasing the pressure in an adsorption bed undergoing the repressurization step by at least one of (i) co-currently introducing a second stream of the feed gas mixture into the adsorption bed undergoing the repressurization step, or (ii) counter-currently introducing a portion of the product gas stream from the adsorption bed undergoing the production step into the adsorption bed undergoing the repressurization step;

wherein at least one adsorption bed undergoes at least part of the purge step simultaneously with at least one other adsorption bed undergoing at least part of the blowdown step, and the stream of purge gas effluent from the adsorption bed undergoing the purge step is combined with the stream of blowdown gas from the adsorption bed undergoing the blowdown step to form a by-product gas stream;

introducing the by-product gas stream into a surge vessel;

withdrawing the by-product gas stream from the surge vessel;

periodically obtaining signals from a sensor operatively disposed to sense a pressure and/or a flow rate of the by-product gas stream before the by-product gas stream is introduced into the surge vessel;

regulating the flow rate of the stream of blowdown gas that is combined with the stream of purge gas effluent during at least a portion of the blowdown step, where the flow rate of the stream of blowdown gas is regulated responsive to the signals from the sensor, wherein regulating the flow rate of the stream of blowdown gas comprises increasing the flow rate of the stream of blowdown gas when it is determined from the signals from the sensor to increase the pressure or flow rate of the by-product gas stream; and decreasing the flow rate of the stream of blowdown gas when it is determined from the signals from the sensor to decrease the pressure or flow rate of the by-product gas stream.

2. The process according to claim 1 wherein it is determined from the signals to increase the pressure of the by-product gas stream when the pressure of the by-product gas stream is less than a target lower limit set point for the pressure of the by-product gas stream or it is determined from the signals to increase the flow rate of the by-product gas stream when the flow rate of the by-product gas stream is less than a target lower limit set point for the flow rate of the by-product gas stream; and wherein it is determined from the signals to decrease the pressure of the by-product gas stream when the pressure of the by-product gas stream is greater than a target upper limit set point for the pressure of the by-product gas stream or it is determined from the signals to decrease the flow rate of the by-product gas stream when the flow rate of the by-product gas stream is greater than a target upper limit set point for the flow rate of the by-product gas stream.

3. The process according to claim 1 wherein the flow rate of at least one of (i) the stream of purge gas introduced into the adsorption bed undergoing the purge step or (ii) the stream of purge gas effluent withdrawn from the adsorption bed undergoing the purge step is regulated.

4. The process according to claim 1 wherein the sensor is operatively disposed to sense the pressure of the by-product gas stream before the by-product gas stream is introduced into the surge vessel; and wherein regulating the flow rate of the stream of blowdown gas comprises increasing the flow rate of the stream of blowdown gas when it is determined from the signals from the sensor to increase the pressure of the by-product gas stream; and decreasing the flow rate of the stream of blowdown gas when it is determined from the signals from the sensor to decrease in the pressure of the by-product gas stream.

5. The process according to claim 4
wherein it is determined from the signals to increase the pressure of the by-product gas stream when the pressure of the by-product gas stream is less than a target lower limit set point for the pressure of the by-product gas stream; and
wherein it is determined from the signals to decrease the pressure of the by-product gas stream when the pressure of the by-product gas stream is greater than a target upper limit set point for the pressure of the by-product gas stream.

6. The process according to claim 1 further comprising:
periodically obtaining signals from a flow rate sensor operatively disposed to sense a flow rate of the by-product gas stream after the by-product gas stream is withdrawn from the surge vessel;
wherein regulating the flow rate of the stream of blowdown gas comprises
increasing the flow rate of the stream of blowdown gas when it is determined from the signals from the sensor and the signals from the flow rate sensor to increase the pressure or flow rate of the by-product gas stream; and
decreasing the flow rate of the stream of blowdown gas when it is determined from the signals from the sensor and the signals from the flow rate sensor to decrease the pressure or flow rate of the by-product gas stream.

7. The process according to claim 1 further comprising:
periodically obtaining signals from a pressure sensor operatively disposed to sense a pressure of the stream of blowdown gas withdrawn from the adsorption bed undergoing the blowdown step;
wherein regulating the flow rate of the stream of blowdown gas comprises
increasing the flow rate of the stream of blowdown gas when it is determined from the signals from the sensor and the signals from the pressure sensor to increase the pressure or flow rate of the by-product gas stream; and
decreasing the flow rate of the stream of blowdown gas when it is determined from the signals from the sensor and the signals from the pressure sensor to decrease the pressure or flow rate of the by-product gas stream.

\* \* \* \* \*